June 1, 1937.  J. BIJUR  2,082,768
CENTRALIZED LUBRICATING APPARATUS
Filed Oct. 11, 1929  2 Sheets-Sheet 1
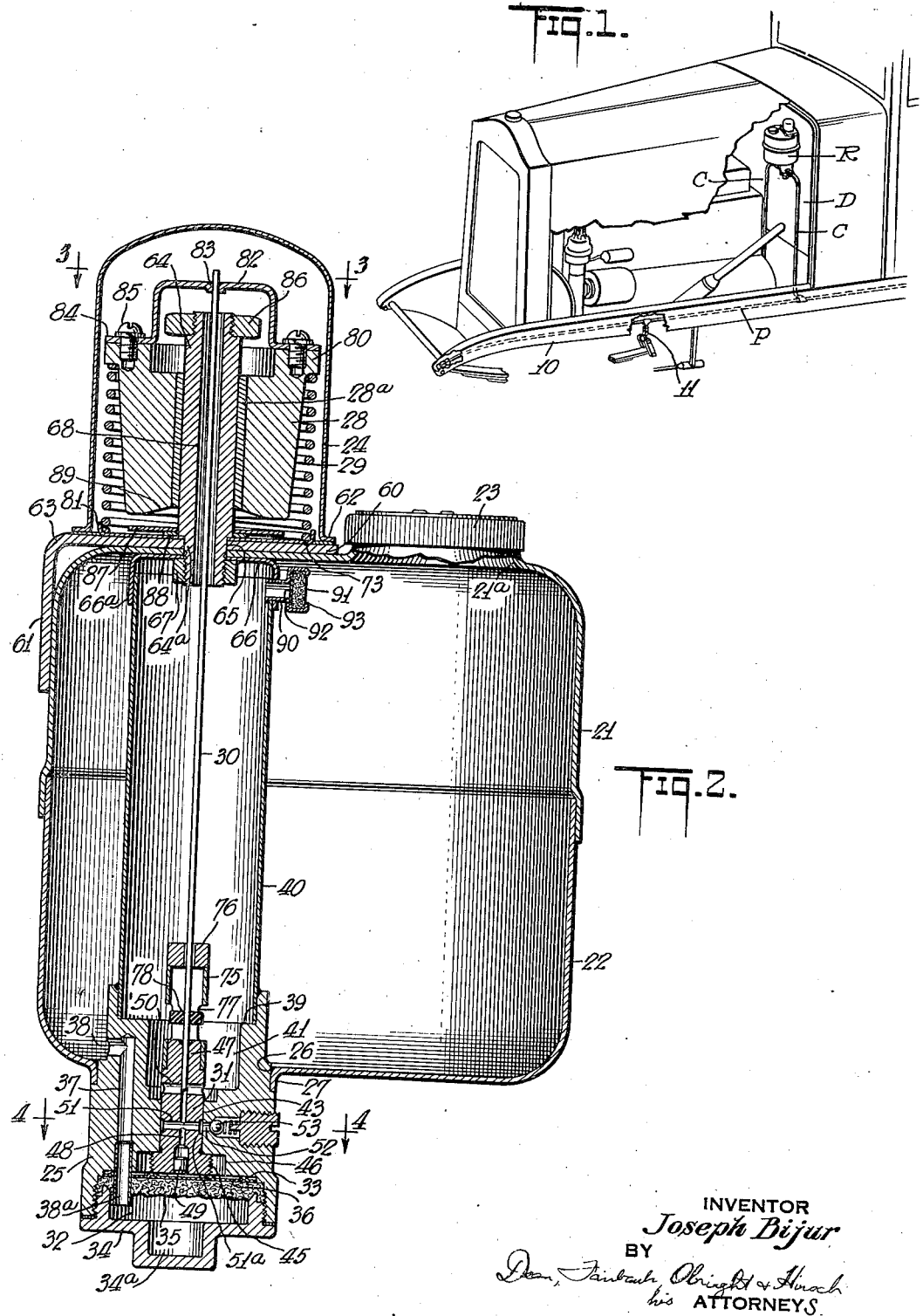

June 1, 1937.  J. BIJUR  2,082,768
CENTRALIZED LUBRICATING APPARATUS
Filed Oct. 11, 1929   2 Sheets-Sheet 2
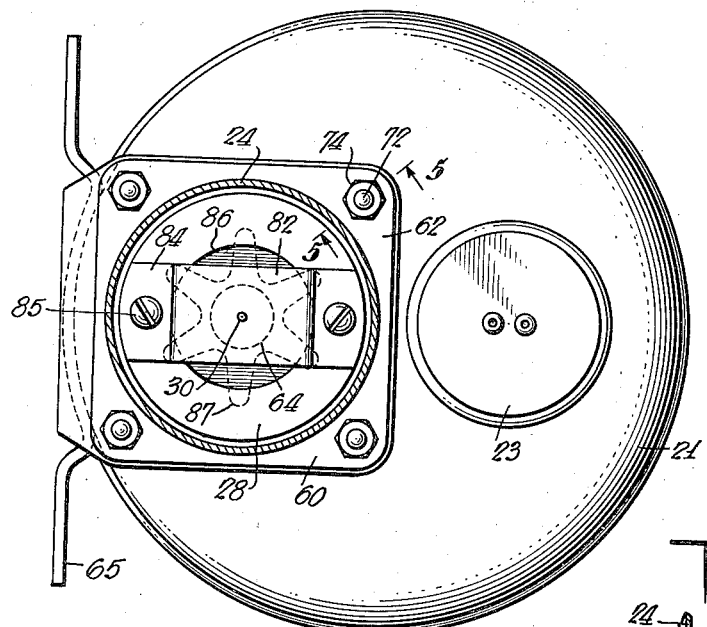
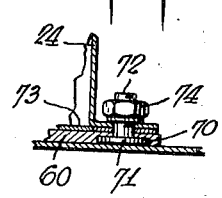
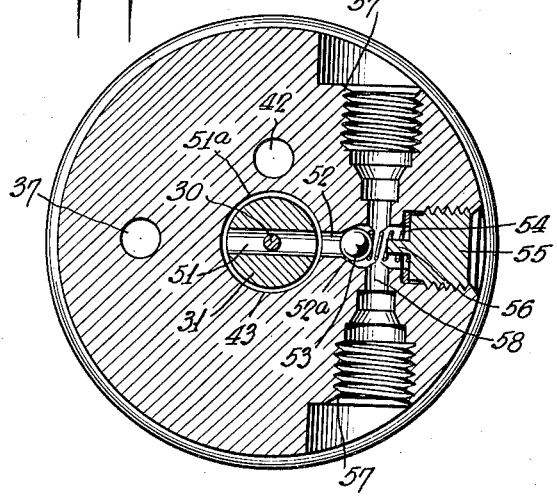
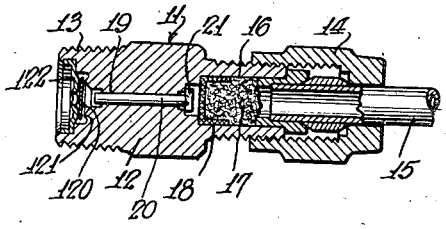
INVENTOR
*Joseph Bijur*
BY
*Dean Fairbank, Obrieghts Hirsch*
his ATTORNEYS Patented June 1, 1937

2,082,768

UNITED STATES PATENT OFFICE 2,082,768

CENTRALIZED LUBRICATING APPARATUS

Joseph Bijur, New York, N. Y., assignor to Auto Research Corporation, a corporation of Delaware Application October 11, 1929, Serial No. 398,840

49 Claims. (Cl. 184—26)

My present invention is concerned with machine lubricating systems of the type in which lubricant from a central reservoir is conveyed through an oil distributing conduit system to the various bearings of the machine, during normal operation of the latter.

It is peculiarly adapted for embodiment in an automatic lubricating apparatus for vehicle chassis bearings, of the type in which a liquid filled conduit system has restricted flow proportioning outlets at the bearings, and oil in minute quantitites is continuously fed into the system by a force pump, thus maintaining a slow but continuous and properly proportioned feed at the bearings An object of the invention is to provide a force pump mechanism, capable of other uses but especially adapted for embodiment in a system of this type, the pump unit in spite of its minute capacity being of comparatively rugged and durable construction, devoid of small wearing parts which might militate against long continued efficiency and so designed that the need for especially delicate or difficult machining operations is avoided.

Another object is to provide a pump and a motor which may be conveniently attached to the reservoir of the system so that the reservoir, pump and motor are capable of storage, shipment and installation as a unit.

Another object is to provide an inertia-operated motor for the pump, deriving its energy from vibrations of the machine to be lubricated, this motor being also readily attachable to the reservoir for handling as a unit therewith and without weakening the reservoir proper, which may be of comparatively light-gauge metal.

Another object is so to house and mount the motor that its bearing surfaces (preferably of the dry sliding type) cannot become sticky or gritty by access of lubricant from the reservoir or by contact with dust and so designed that it will not knock or rattle in use, nor will any of the parts thereof tend to rattle or warp during shipment or storage, even though the unit is laid on its side.

Another object is so to connect the driving element of the motor with the driven element of the pump that no precision alignment of pump and motor need be made during assembly of the pump and motor on the reservoir.

Another object is to provide a pump and reservoir unit which will maintain a pre-filtered supply of lubricant always available for pumping purposes and entirely segregated from the unfiltered contents of the reservoir, and which will permit utilization of substantially a full reservoir charge before refilling is necessary.

Another object is to provide a combined pump, reservoir and motor unit of simple, practical, rugged, durable construction capable of ready disassembly for purposes of inspection or repair by a mechanic, but in the form of an entirely self-contained unit, capable of ready refilling, preadjusted at the factory to meet all normal operating conditions and not only requiring no adjustments in use, but being so arranged that the adjustment mechanism is inaccesssible and proof against tampering.

Another object is to provide an inertia operated force pump mechanism which is operative to deliver an adequate amount of oil to the bearings during all running conditions of the car and which is effective to prevent overoiling on rough roads or underoiling on smooth ones and to assure a substantially uniform rate of oil delivery at the bearings, which rate is properly adapted to meet the requirements of the bearings.

In a preferred embodiment of the invention, the pump assemblage is pendant from the bottom of the reservoir and the motor assemblage is supported on the reservoir top. A suitably vented cylinder for filtered oil extends vertically through the reservoir, oil from the reservoir draining through a filter and rising in the cylinder to immerse the pump and feed thereto by gravity.

The pump is preferably of the unpacked plunger type and the motor includes a spring balanced inertia weight sliding on a hollow unlubricated bearing post. The pump cylinder is of such small cross sectional area that it is difficult properly to machine a rigid plunger and precisely align it with the weight. I, therefore, use a long, somewhat springy wire serving the dual function of both plunger and connecting rod. This wire is attached at its upper end to the weight and its lower end enters the pump cylinder. Slight flexing or warping of the wire being immaterial, precision alignment of pump and motor unit is unnecessary.

The invention may be more fully understood from the following description in connection with the accompanying drawings, wherein Fig. 1 is a perspective view of an automobile chassis, with parts broken away and with the lubricating mechanism of the present invention applied.

Fig. 2 is an enlarged vertical sectional view through the reservoir, pump and motor unit.

Fig. 3 is a sectional plan view on the line 3—3 of Fig. 2.

Fig. 4 is a further enlarged transverse section on the line 4—4 of Fig. 2.

Fig. 5 is a sectional detail on the line 5—5 of Fig. 3, and

Fig. 6 is a section through one of the flow-controlling outlets of the system.

Fig. 1 shows fragmentarily a rather typical chassis lubricating system with which my improved reservoir and pump unit is adapted to be used. This unit R is shown mounted upon the dashboard D of the car and delivers lubricant under pressure into two conduit branches C, leading to main pipes P extending along the channelled chassis frame 10 of the car and supplying lubricant to the various chassis bearings, through suitable restricted flow-proportioning outlets such, for instance, as the drip plug fitting of Fig. 6.

This plug consists of a body portion 12 having one end threaded at 13 for application to a receiving socket (not shown) in the bearing and having its other end connected as by a compression coupling 14 to a pipe 15 of the distributing system. The coupled end of the member 12 is provided with a socket therein encasing a wad of felt or equivalent filtering material 17 confined within a suitable wire basket 18. A bore 19 extending from the socket 16 to the end of the body 12 is substantially filled with a flow-restriction pin 20 having a head 21 disposed in the socket 16, to prevent axial displacement of the pin. A suction seated flap valve 120 working against an outwardly facing seat 121 in the base of the fitting and retained against loss by a perforated disk 122 serves to prevent siphoning through the conduit lines when the drip plugs are located at materially different levels.

In practice the bores 19 of all of the drip plugs are of the same diameter, their flow resistance, or in other words, their proportionate rate of feed being rated or determined by the diameter of the restriction pins. Thus, flow from all of the fittings is continuous but in proportions determined in accordance with the requirements of the individual bearings by the selection of properly rated plugs.

It will be understood that many types of drip plugs or other control fittings or devices might be substituted for the one illustratively shown here, such, for instance, as drip plugs devoid of valves at their outlets.

My present invention is more particularly concerned with the construction of a reservoir, pump and motor unit adapted to serve as a central lubricant source and as the means for continuously and automatically feeding lubricant under pressure into the conduit system during normal running of a car.

The reservoir consists of a pair of light-gauge generally cup-shaped stampings 21 and 22, the mouths of which are telescoped and welded or otherwise secured together in liquid-tight relationship, the upper inverted cup 21 being provided with a filling spout 21ᵃ closed by a vented cap 23.

A dome-like housing 24 for the motor assemblage is disposed upon the top of the reservoir in approximate alignment with a pendant base casting member 25 secured in the bottom of the reservoir and carrying the pump assemblage.

An inertia weight 28 floating on a coiled spring 29 in housing 24 is actuated by vehicle vibration to operate a small capacity force pump arranged within the base casting 25, the pump piston and piston rod consisting preferably of a long, springy wire 30 connected at its upper end to the weight and sliding at its lower end in a corresponding vertical bore 47 in the cylinder block 31 of the pump.

A cylinder 40 which has its lower end fitted into socket 39 in the base casting and its upper end telescoped into a pendant flange 66ᵃ of a closure cap 66 secured to the under face of the reservoir top, serves as a reservoir for filtered oil for the pump and segregates this oil from the body of lubricant in the reservoir as will be later described.

Oil from the reservoir flows by gravity into a filter chamber 32 at the bottom of the base casting 25. This flow is through a radial port 38 into a vertical passageway 37 delivering into chamber 32. The chamber may be conveniently formed by a downwardly facing socket 33 in the lower end of the casting and a cooperating plug member 34 screwed into the socket and having a pendant portion 34ᵃ serving as a sediment trap. A filter pad 35 backed by a corrugated screen 36 is held pressed against the upper inner end of the socket 32 by the plug 34, the rim of which grips the pad edge, the lubricant being conducted downwardly through the pad by short pipe extension 38ᵃ of the passage 37.

Lubricant seeping through the filter pad 35 seeks its own level in the cylindrical chamber 40, upflow of lubricant being through the vertical passageway 42 (see Fig. 4). Under ordinary conditions the lubricant in the cylinder 40 will be at about the same level as the lubricant in the reservoir. Inasmuch, however, as the base casting 25 is for the most part pendant below the reservoir, and inasmuch as the inlet ports 50 of the pump are disposed at the bottom of a well 41 in the casting below the cylindrical chamber 40, there will still be oil in this well available for pumping even after the main reservoir has been completely evacuated.

The pump is of the self-porting, unpacked, plunger type. The block 31 is of cylindrical shape force fitted into a cylindrical bore 43 in the base casting. The upper end of the block extends into the well 41 and the lower end thereof is provided with an externally threaded head 45 arranged within a relatively capacious recess 46 above the filter chamber. To withdraw the pump block the plug 34 is unscrewed, the filter pad and screen are removed, and a threaded socket wrench is used to engage the head 45 and provide a purchase for extracting the pump block.

The longitudinal central cylindrical bore 47 extends through the length of the pump block and has its lower end plugged as at 49. This bore is intersected at a point above the bottom of the well by a transverse passageway, the ends of which define the inlet ports 50 and is intersected lower down by a transverse passageway 51, communicating with an annular groove 51ᵃ on the body which coacts with bore wall 43 to form a conduit. That portion of the bore 47 lying between ports 50 and outlets 51 serves as the pump cylinder proper, in other words, determines the effective volume of the pump, and that portion of the bore 47 above the inlet ports 50 serves to guide the lower end of the wire connecting rod and plunger 30.

The groove 51ᵃ communicates with an outlet port 52 in the base casting, which port intersects a transverse passageway 58 having sockets 57 at its ends into which the conduit lines C, C are adapted to be coupled. Flow from the port 52 into these conduit lines is opposed by a ball check valve 53 urged by coiled expansion spring 54 against a seat 52ᵃ formed by enlarging the outer end of the port 52. The spring 54 is backed by plug 55 screwed into a suitable socket in the base casting in horizontal alignment with groove 51ᵃ. A projection 56 in this plug centers the spring.

It will thus be seen that as the motor weight 28 reciprocates, filtered lubricant flows into the pump cylinder and is expelled past the ball valve 53 into the conduit system. Under normal conditions, that is to say, with the weight 28 at rest, the lower end of the rod 30 is disposed at the ports 50 and does not completely block flow of lubricant into the pump cylinder, the well 41 being normally full of oil.

Unduly violent reciprocations of the rod 30 are checked by a dash pot mechanism associated with the pump. This mechanism includes a sleeve 75, the lower end of which is telescoped onto the reduced upper end of the pump cylinder block 31 and the upper end of which supports a weighted block 76. Intermediate its ends the sleeve 75 is slotted or otherwise apertured at 77 so that lubricant in the chamber 40 may flow freely into the sleeve. A piston collar 78 is fixed upon the rod 30 at a point slightly below the tops of the slots 77 and is of an external diameter nearly equal to the internal chamber of the sleeve.

The dash pot action is as follows:—With sleeve 75, full of oil, if a sudden violent upstroke of the rod 30 occurs, the collar 78 will enter the unapertured upper end of the sleeve and the oil trapped thereby must raise the weight 76 in order to escape. This retarding action is comparatively slight but as the connecting rod starts on its down stroke, the weight 76 will seat and the collar 78 cannot move downwardly any faster than the oil can leak around it into the top portion of the sleeve.

In constructing and mounting the motor mechanism which is housed within the casing 24, a relatively rigid guiding means is provided for the comparatively massive inertia weight 28, in order to prevent rattling thereof during operation. The reservoir shell itself is preferably comparatively thin and not well adapted to the rigid support and guidance of such a heavy element.

In accordance with the present invention, however, I have provided an efficient means for mounting the weight without appreciably weakening the shell 21. An important factor in effecting this result is the generally L-shaped bracket 63 of relatively heavy gauge metal which includes an upper platform portion 60 lying upon the flat top of the reservoir and if desired, spot-welded thereto. The pendant tail portion 61 of this bracket overlies the side of the reservoir, is welded thereto and provided with laterally extending ears 65 adapted to be bolted or otherwise secured on the dash board D or other wall to which the reservoir is firmly mounted.

It is undesirable to perforate the top of the tank, yet some means must be provided for detachably mounting the motor housing 24. Screw studs 72 (see Figs. 3 and 5) projecting upwardly through the bracket include heads 71 lying in recesses 70 in the lower face of the bracket portion 60 so that by assembling the studs prior to the attachment of the bracket, the studs are securely anchored with their ends projecting upwardly and without passing them through the reservoir top. These stud ends pass through aligned openings in the peripheral edge of a thin metal plate member 73 lying upon the top of the platform bracket portion 60 and through suitable openings in an outwardly turned flange 62 at the lower end of the dome 24, nuts 74 being screwed upon the upper ends of the studs 72 to clamp the dome or motor housing and the disk 73 in position.

The heavy bracket 63 lends rigidity to the mounting of the hollow post 64 which guides the vertical sliding movement of the inertia weight 28. This post has a reduced lower end 64ᵃ, passed through aligned openings 65 in the bracket portion 60, reservoir top 21 and plate 73 and is secured in position by a nut 67 screwed onto its lower end, this nut incidentally serving to clamp the cap 66 against the under face of the reservoir top.

The inertia weight 28 is hollow and lined with a bushing 28ᵃ which provides a dry bearing for the movement of the weight on the bearing post 64. The weight is of generally tapering shape from its upper to its lower end and at its upper end is provided with an outwardly extending flange 80 providing a ledge which rests upon the top of its supporting spring 29. This spring reacts against the disk 73 and is restrained laterally by ears 81 struck upwardly from the disk.

The means for anchoring the upper end of the spring rod 30 to the weight includes a generally U-shaped bracket or strap 82, the intermediate portion of which is soldered or otherwise secured at 83 to the rod 30 and the feet 84 of which are screwed at 85 upon the top of the weight. A nut 86 screwed upon the threaded top of the post 64, limits upward movement of the weight and a buffer spring 87 encircling the lower end of the post 68 and resting on a collar 88 limits downward movement of the weight.

This spring, as seen in dotted lines in Fig. 3, is generally star-shaped and the bottom of the weight is slightly recessed at 89 so that only the ends of the buffer spring fingers are engaged by the weight.

Venting means prevents air blocking in the storage cylinder 40, and since it is undesirable to permit the access of dust into the motor housing by venting the latter, the vent is preferably provided in the cylinder 40 close to its upper end and above the high oil level in the reservoir.

The venting means may conveniently include a nipple 90 screwed into the upper end of cylinder 40 and having an enlarged mouth in which a wad 91 of air-pervious, dust-exclusive filter material is held, this material being backed against screen 92 and held against displacement by the inwardly spun mouth 93 of the nipple. It permits free venting of air from the cylinder 40 as this cylinder starts to fill with oil. Any oil which may enter cylinder 40 through the vent is suitably filtered in its passage therethrough.

The operation of the device is as follows:

The reservoir is supplied with oil through the filling spout 21ᵃ. This oil flows by gravity through the passageways 36, 37 and pipe 38ᵃ into the filter chamber, 32 and seeping slowly through the filter pad 35, flows upwardly through the passageway 42 into the well 41 and cylinder 40 until the column of filtered oil within the cylinder 40 is at the same level as the unfiltered oil in the reservoir.

Under normal conditions, the spring pressure on the check valve 53 is adequate to prevent any gravity drainage of oil through the pump although oil flows freely in and fills the pump cylinder and all associated passageways in advance of the valve 53 and below the oil level in the cylinder 40.

As soon as the vehicle is set in motion, the vibrations occurring impart a jiggling motion to the inertia weights 28 and cause consequent reciprocation of the rod 30. This rod, therefore, is alternately retracted beyond the inlet port 50 and rammed home into the pump cylinder, expelling minute charges of oil past the check valve 53 and into the distributing conduit system.

In practice the dash pot acts to prevent overoiling on rough roads, since the violent vibrations incident to travelling over such roads tend to increase the effective pump stroke, the retardation of speed effected by the dashpot affords adequate compensation for the increased stroke. Under all running conditions the pump applies an adequate amount of lubricant for the various chassis bearings with no danger of underoiling and with no danger of excessive overoiling. On some occasions the small pump cylinder may be substantially emptied by the working stroke of the piston rod and on other occasions the piston rod may merely enter the upper end of the cylinder and expel a very small charge of oil. Any sudden violent upstroke of the weight and piston rod is sharply counteracted on the down stroke of the dash pot action and any sudden down stroke is sharply interrupted by the buffer spring 87.

When the car is not in motion the connecting rod 30 comes to rest with its lower end substantially at the ports 50, partially closing these ports but permitting oil to flow into and fill the pump cylinder. Valve 53 prevents leakage or gravity feed into the system when the motor is not operating, i. e. when the vehicle is not in motion.

In order to effect the correct setting of the connecting rod, the weight is fully depressed and the rod is pushed down until its lower end abuts a stop fixture inserted into the lower end of bore 48 prior to the application of the plug. A drop of solder is applied at 83 to fix the rod to the strap and render further adjustment of the rod unnecessary. This method facilitates initial adjustment and definitely sets the maximum of travel of the plunger on its down stroke. The strength of the weight sustaining spring is always known with sufficient accuracy to assume the positioning of the lower end of the plunger substantially at the inlet port when the weight is released and allowed to spring back after the soldering operation.

Even after the tank 21, 22 has been completely evacuated by gravity flow of oil there will still be a slight head of oil available at the pump, this head being equal to the vertical distance between the bottom of port 38 and the bottoms of ports 50, and standing in a column in the passage 37 and well 41 with the intervening filter chamber and passageway 42 filled with oil. Occasionally, before refilling, the plug 34 may be removed and sediment dumped with little loss of oil.

From the standpoint of assembly the present construction affords many advantages and it will be obvious that both the lower pump assemblage and the upper motor assemblage are capable of independent application substantially as units to the reservoir, the nature of the combined connecting rod and pump plunger 30 compensating for any slight misalignment is assembly.

The construction, due to the fact that no adjustable elements are accessible after assembly, affords little opportunity for a car owner whose curiosity exceeds his mechanical ability to tamper with and possibly injure the mechanism, yet it permits ready disassembly and replacement of parts by an expert mechanic.

I claim:

1. A reservoir, pump and motor unit for centralized liquid distributing systems, including a reservoir tank, a pump mounted at the bottom thereof and a motor mounted at the top thereof, and a long flexible connecting rod between motor and pump adapted to accommodate misalignment of said motor and pump, the motor including a spring supported inertia weight and a hollow post upon which the weight is slidable, said connecting rod extending through the post and being fixed to the weight.

2. As a new article of manufacture, an inertia pump including a resiliently supported reciprocating weight, a connecting rod to operate the pump and a dash pot acting on the connecting rod, said dash pot being of the double acting type submerged in the liquid which supplies the pump and using such liquid as its retarding fluid.

3. A reservoir and pump unit including a tank, a base casting secured to and projecting below the bottom of the tank, a fixed cylinder within said reservoir secured upon the top of the base casting and extending above the liquid level in the tank, a pump including a piston and an enclosing member in the base casting encircled by the lower part of said cylinder, and means defining a flow passageway from the tank into the cylinder through the casting.

4. A reservoir and pump unit including a tank, a base casting secured to and projecting below the bottom of the tank, a fixed cylinder within said reservoir secured upon the top of the base casting and extending above the liquid level in the tank and being connected to the top of the tank, a pump including a piston and an enclosing member in the base casting encircled by the lower part of said cylinder, means defining a flow passage from the reservoir into the cylinder through the casting.

5. In a reservoir and pump unit for centralized lubricating systems or the like, a tank, a base casting secured in the bottom of the tank and extending therebelow, said casting having a well in its top, a fixed cylinder within said reservoir rising from the well and having liquid tight connection therewith, a pump unit of the self-porting, unpacked, plunger type including a piston and an enclosing member mounted in the base casting encircled by the lower part of said cylinder and having its inlet ports disposed in the well and means providing a gravity flow path for oil from the reservoir into the well through the base casting.

6. In a supply unit for centralized lubricating systems or the like, a reservoir, a base casting secured in the bottom of the reservoir and extending therebelow, said casting having a well in its top, a fixed cylinder within said reservoir rising from the well and having liquid tight connection therewith, a small capacity pump unit of the self-porting, unpacked, plunger type including a piston and an enclosing member mounted in the base casting encircled by the lower part of said cylinder and having its inlet ports disposed in the well, means providing a gravity flow path for oil from the tank into the well through the base casting and a dense filter of large effective area interposed in said flow path.

7. As a new element in a supply installation for centralized lubricating systems, a pump carrying casting adapted to be secured in the bottom of a reservoir, said casting being formed with a well in its top and with a downwardly facing socket in its bottom and with a bore connecting them, a plug closing the bottom of the socket, a pump body fitted into the bore, a passageway through which oil may flow by gravity from the reservoir into the socket, and a second passageway through which oil may flow from the socket into the well.

8. As a new element in a supply installation for centralized lubricating systems, a pump carrying casting adapted to be secured in the bottom of a reservoir, said casting being formed with a well in its top and with a downwardly facing socket in its bottom and with a bore connecting them, a pump body fitted into the bore, a passageway through which oil may flow by gravity from the reservoir into the socket, a second passageway through which oil may flow from the socket into the well and a filter guarding flow through such passageway.

9. As a new element in a supply installation for centralized lubricating systems, a pump carrying casting adapted to be secured in the bottom of a reservoir, said casting being formed with a well in its top and with a downwardly facing socket in its bottom and with a bore connecting them, a plug closing the bottom of the socket, a pump body fitted into the bore, a passageway through which oil may flow by gravity from the reservoir into the socket, a second passageway through which oil may flow from the socket into the well and a filter guarding flow through such passageway, said filter comprising a filter pad retained in place by the plug.

10. As a new element in a supply installation for centralized lubricating systems, a pump carrying casting adapted to be secured in the bottom of a reservoir, said casting being formed with a well in its top and with a downwardly facing socket in its bottom and with a bore connecting them, a plug closing the bottom of the socket, a pump body force fitted into the bore, a passageway through which oil may flow by gravity from the reservoir into the socket, a second passageway through which oil may flow from the socket into the well and a filter guarding flow through such passageway, said filter comprising a filter pad retained in place by the plug, the pump body including an enlarged tool receiving portion arranged in the socket above the filter pad whereby the pump body may be withdrawn when the plug and pad are removed.

11. A pump unit for centralized lubricating systems adapted for partial immersion in the lubricant reservoir of the system, said unit including an upstanding fixed elongated casing within said reservoir, a reciprocating force pump of relatively small capacity at the bottom of the casing, means providing a flow path for oil from the reservoir into the casing to normally immerse the pump, a connecting rod extending through the casing, a pump plunger rigid with the connecting rod, and a dash pot means to limit the range and retard the violence of the connecting rod reciprocations.

12. A pump unit for centralized lubricating systems adapted for partial immersion in the lubricant reservoir of the system, said unit including an upstanding fixed elongated casing within said reservoir, a reciprocating force pump of relatively small capacity at the bottom of the casing, means providing a flow path for oil from the reservoir into the casing to normally immerse the pump, a connecting rod extending through the casing, a pump plunger rigid with the connecting rod, and dash pot means associated with the pump to limit the range and retard the violence of the connecting rod reciprocations.

13. A pump unit for centralized lubricating systems adapted for partial immersion in the lubricant reservoir of the system, said unit including an upstanding elongated casing, a reciprocating force pump of relatively small capacity at the bottom of the casing, means providing a path for oil from the reservoir into the casing to normally immerse the pump, a connecting rod and pump plunger extending through the casing, a dash pot to limit the range and retard the violence of the connecting rod reciprocations, the dash pot including a cylinder encircling the connecting rod and having a heavy gravity seated top closure, a piston member fixed on the connecting rod and having small clearance relatively to the cylinder, the weighted closure retarding upward movement of the collar member and the small clearance between collar and cylinder retarding downward movement of the collar member.

14. A pump unit for centralized lubricating systems adapted for partial immersion in the lubricant reservoir of the system, said unit including an upstanding elongated casing, a re-reciprocating force pump of relatively small capacity arranged in the bottom of the casing, means providing a flow path for oil from the reservoir into the casing to normally immerse the pump, a connecting rod extending through the casing, a pump plunger rigid therewith, a dash pot to limit the range and retard the violence of the connecting rod reciprocations, including a cylinder fixed to the top of the pump having openings in its intermediate portion and having a weight resting on and substantially closing its top, a piston fixed to the connecting rod, closely fitting the cylinder and cooperating with the weight to retard the connecting rod movement when the piston passes beyond the apertured portion of the cylinder.

15. In combination with a central lubricating system, a supply and pressure source comprising a reciprocating pump having a reciprocating element and a liquid immersed dash pot for retarding the movement of a vertically reciprocating element including a cylinder encircling the element and having apertures in one portion thereof for free flow of liquid into and out of the cylinder, a gravity seated weighted closure for the top of the cylinder and through which the element is movable with slight clearance, a piston fixed to the element and of slightly less diameter than the cylinder, adapted to force the weight off its seat by liquid pressure as it enters the unapertured portion of the cylinder and retard the upstroke of said element and to retard the downstroke of the element by providing a small flow passage between itself and the cylinder walls when the weight is seated.

16. A force pump unit adapted to feed lubricant from a central reservoir into a lubricant distributing system, the unit including a casting member adapted to be secured in the bottom of a reservoir and a pump body member fitted into the casting and having its upper end extending into the oil in the reservoir, the pump body having a longitudinal cylinder bore therein, closed at its lower end, a gravity inlet port in the upper portion of the body and a valve controlling outflow from the cylinder and a self-porting plunger reciprocating in the cylinder, the lower end of said body extending into a recess in the bottom of the casting and being accessible to a withdrawing tool.

17. A reservoir, pump and motor unit of the class described including a reservoir shell, a pump in the bottom thereof, a bracket of heavier gauge than the shell providing a platform portion overlying the shell top, a bearing post rigidly fixed in said platform portion, a spring supported inertia weight sliding on the bearing post and means connecting the weight to the pump.

18. A reservoir pump and motor unit of the class described including a reservoir shell, a pump in the bottom thereof, a platform overlying the shell top, a bearing post rigidly fixed in said platform portion, a spring supported inertia weight sliding on the bearing post, means connecting the weight to the pump, the shell being so bonded to the platform as to avoid puncturing of the shell in attaching the bracket.

19. A reservoir pump and motor unit of the class described including a reservoir shell, a pump in the bottom thereof, a plate overlying and fixed to the shell top, a bearing post rigidly fixed in said plate, a spring supported inertia weight sliding on the bearing post, means connecting the weight to the pump, a dome-like housing for the weight, securing means for the dome including studs having heads lying in recesses in the under face of the plate and threaded portions adapted to project through a flange at the bottom of the dome and adapted to receive securing nuts.

20. A reservoir pump and motor unit of the class described including a reservoir shell, a pump in the bottom thereof, a bracket providing a platform portion overlying the shell top, a bearing post rigidly fixed in said platform portion, a spring supported inertia weight sliding on the bearing post, means connecting the weight to the pump, a housing for the weight, and a plate lying upon the top of the bracket and including a portion disposed within the housing to center the weight supporting spring.

21. A reservoir, pump and motor unit of the class described including a reservoir shell, a pump in the bottom thereof, a platform overlying the shell top, a bearing post rigidly fixed in said platform, a spring supported inertia weight sliding on the bearing post, means at the post to limit the upward movement of the weight and a buffer spring encircling the lower end of the post to limit and cushion the downward movement of the weight.

22. A reservoir, motor and pump unit including a reservoir shell, a pump arranged adjacent the bottom of the shell, a hollow bearing post fixed to and rising from the top of the shell, a cylinder extending from the pump approximately to the top of the shell and into which oil from the reservoir is adapted to flow, means to filter such oil before it reaches the cylinder, means screwed on to the lower end of the bearing post to retain the cap in position, an inertia weight sliding member on the post, a spring supporting the inertia weight in floating position, a strap carried by the inertia weight and straddling the post, and a connecting rod for actuating the pump rigidly fixed to the strap and extending through the post.

23. A reservoir, motor and pump unit including a reservoir shell having a filling opening therein and a vented cap for said opening, a pump arranged adjacent the bottom of the shell, a hollow bearing post fixed to and rising from the top of the shell, a cylinder extending from the pump approximately to the top of the shell and into which oil from the reservoir is adapted to flow, means to filter such oil before it reaches the cylinder, a cap closing the top of the cylinder, means screwed on to the lower end of the bearing post to retain the cap in position, an inertia weight sliding member on the post, a spring supporting the inertia weight in floating position, a strap carried by the inertia weight and straddling the post, a connecting rod for actuating the pump and being springy, thin, metal stock to accommodate for misalignment of the motor and pump, and means to vent the upper end of the cylinder into the reservoir.

24. As a new element in a supply installation for centralized lubricating systems, a pump construction secured to the bottom of a reservoir and depending therebelow, said construction including a non-filtered lubricant inlet chamber at the bottom thereof and a filtered lubricant chamber at the top thereof, passageways in the pump construction for conducting lubricant from the reservoir to the unfiltered chamber and from the unfiltered chamber to the filtered chamber and a filter blocking the passageway from the unfiltered chamber to the filtered chamber.

25. As a new element in a supply installation for centralized lubricating systems, a pump carrying casting adapted to be secured in the bottom of a reservoir, said casting being formed with a vertical central passageway enlarged at its ends to form inlet chambers, one of which is at the bottom and the other of which is at the top of said casting, and a pump element plugging the unenlarged portion of the central passageway, said casting being provided with additional passageways to establish communication between the inlet chambers and with the reservoir.

26. A lubricant supply and pressure installation for a central lubricating system comprising a reservoir casing, and a pump construction positioned adjacent the bottom of said casing, said construction comprising a pump chamber, a reciprocating element therein, inlet and outlet passages communicating with said pump chamber, a valve in said outlet passageway and a flat filter below said pump chamber and blocking said inlet passageway.

27. The installation of claim 26 in which the pump construction depends from the bottom of the reservoir and in which the inlet passageways extend downwardly from the reservoir across the filter to a point therebelow and upwardly from below the filter to a point thereabove, the downwardly extending passageway being unblocked by the filter and the upwardly extending passageway being blocked thereby.

28. The installation of claim 26 in which the pump construction depends downwardly from the casing and is provided with a pump inlet compartment draining lubricant from the bottom of said casing, in the upper part of which inlet compartment is positioned a flat filter obstructing entrance to the inlet passageway initiating thereat.

29. As a new element in a supply installation for centralized lubricating systems, a pump carrying construction adapted to be secured to the bottom of a reservoir, said casting being formed with a central bore, a pump body force fitted into the bore, the pump body including an enlarged tool receiving portion at its bottom whereby the pump body may be withdrawn from said bore.

30. A reservoir, motor and pump unit including a reservoir shell, a pump arranged adjacent the bottom of the shell, a hollow bearing post fixed to the top of the shell, an inertia weight sliding member exteriorly positioned on the post, a spring supporting the inertia weight in floating position, and a connecting rod for actuating the pump connected to the top of the weight and extending through the post.

31. A reservoir, pump and motor unit for centralized liquid distributing systems, including a reservoir, a pump mounted at the bottom thereof and a motor mounted at the top thereof, and a connecting rod between motor and pump, the motor including a spring supported inertia weight and a hollow post exteriorly providing an unlubricated slide bearing for the weight enclosing said connecting rod.

32. A reservoir, pump and motor unit for centralized liquid distributing systems including a reservoir tank, a pump positioned adjacent the bottom thereof, consisting in part of a pump cylinder and a pump piston inserted therein, a reciprocating inertia weight mounted above the top of the tank and a connection extending from said weight to said piston through the top of the tank, said weight, said connection and said piston being so constructed as to reciprocate upwardly and downwardly together and provided solely with bearings at the weight and at the piston and with a guide for said connection at the top of the reservoir.

33. In combination with a central lubricating system, a supply and pressure source comprising a reciprocating pump having a reciprocating element and a liquid immersed dash pot for retarding the movement of a reciprocating element including a loose reciprocating cylinder encircling the element, a stop for said cylinder, means tending to force said cylinder against said stop, and a piston fixed to the element of slightly less diameter than the cylinder and reciprocating therewithin whereby reverse strokes of the element are successively retarded by the piston tending to press the cylinder against the stop and against said means due to the small flow passage between itself and the cylinder walls.

34. A reservoir-pump installation for a lubricating system comprising a reservoir casing, a motor positioned above the top of said casing, a pump positioned below the bottom of said casing and below said motor provided with an inlet, a cylinder extending through said casing between the said motor and said pump from the top of the casing to the bottom thereof and a connecting rod passing through said cylinder from said motor to said pump, said cylinder forming an admission chamber between said pump inlet and said casing and said pump inlet opening directly into said chamber.

35. A pump unit for centralized lubricating systems, said unit including a casing, a reciprocating force pump at the bottom of the casing, a connecting rod and pump plunger extending through the casing, a dash pot to limit the range and retard the violence of the connecting rod reciprocations, the dash pot including a cylinder encircling the connecting rod and having a heavy gravity seated top closure, a piston collar member fixed on the connecting rod and having small clearance relatively to the cylinder, the weighted closure retarding upward movement of the collar member and the small clearance between collar and cylinder retarding downward movement of the collar member.

36. A pump unit for centralized lubricating systems, said unit including a casing, a reciprocating force pump arranged at the bottom of the casing, a connecting rod extending through the casing, a dash pot to limit the range and retard the violence of the connecting rod reciprocations, including a cylinder fixed to the top of the pump having openings in its intermediate portion and having a weight resting on and substantially closing its top, a piston fixed to the connecting rod, closely fitting the cylinder and cooperating with the weight to retard the connecting rod movement when the piston passes beyond the apertured portion of the cylinder.

37. A reservoir, pump and motor unit for centralized liquid distributing systems, including a reservoir tank, a pump mounted adjacent the bottom thereof and a weight motor mounted at the top thereof, and a long resilient connecting rod between motor and pump adapted to accommodate misalignment of said motor and pump, the lower end of said rod serving as the pump plunger, said weight and said connecting rod constituting a single unit devoid of movable joints wherein said rod is rigidly and directly connected to said weight, the weight and the connecting rod at all times reciprocating upwardly and downwardly in phase together and said rod and plunger being of the same diameter throughout their length from the point of attachment to the weight to the lower end of the plunger.

38. A reservoir, pump and motor unit for centralized liquid distributing systems, including a reservoir tank, a pump mounted adjacent the bottom thereof, and a motor mounted at the top thereof, and a long resilient connecting rod between motor and pump adapted to accommodate misalignment of said motor and pump, the pump being of the self-porting plunger type and the lower end of said connecting rod constituting the pump plunger, said weight and said connecting rod constituting a single unit devoid of movable joints wherein said rod is rigidly and directly connected to said weight, the weight and the connecting rod at all times reciprocating upwardly and downwardly in phase together and said rod and plunger being of the same diameter throughout their length from the point of attachment to the weight to the lower end of the plunger.

39. A reservoir, pump and motor unit for centralized liquid distributing systems, including a reservoir tank, a pump mounted adjacent the bottom thereof and a motor mounted at the top thereof, and a long resilient connecting rod between motor and pump adapted to accommodate misalignment of said motor and pump, the pump being of the self-porting plunger type and the lower end of said connecting rod constituting the pump plunger, the motor being of the inertia type including a floating weight fixed to the upper end of said connecting rod, said weight and said connecting rod constituting a single unit devoid of movable joints wherein said rod is rigidly and directly connected to said weight, the weight and the connecting rod at all times reciprocating upwardly and downwardly in phase together and said rod and plunger being of the same diameter throughout their length from the point of attachment to the weight to the lower end of the plunger.

40. A reservoir, pump and motor unit for centralized liquid distributing systems, including a reservoir, a pump mounted at the bottom thereof and a motor mounted at the top thereof, and a connecting rod between motor and pump adapted to accommodate misalignment of said motor and pump, the motor including a spring supported inertia weight and a hollow post providing an unlubricated slide bearing for the weight, said post being supported at its lower end below said weight and projecting upwardly within the weight.

41. In a central lubricating installation for the central chassis bearings of an automobile chassis, said installation being of the type having a branched distributing piping system with a single inlet and a plurality of outlets to the bearings, and drip plugs in said outlets regulating the feed to said bearings; means for forcing lubricant under pressure into said inlet actuated by the movement of the automobile chassis upon a road, said means being designed to maintain a substantially constant lubricant pressure and feed without being substantially affected by oscillating movements of excessive violence over short periods of time, and said means including a reservoir and pump unit having a tank having a pump arranged at the lower end thereof, an upstanding casing in the tank above the pump and into which liquid from the tank flows to supply the pump, means to operate the pump, including a connecting rod extending through said casing, an inertia member including a resiliently supported reciprocating weight for reciprocating it and dash pot means associated with the connecting rod to damp the violence and limit the range of the connecting rod movement, said pump and said dash pot being provided with pistons connected in series, the piston of said dashpot having a substantially greater area than the piston of said pump.

42. In a central lubricating installation for the chassis bearings of an automobile chassis, said installation being of the type having a branched distributing piping system with a single inlet and a plurality of outlets to the bearings, and drip plugs in said outlets regulating the feed to said bearings; means for forcing lubricant under pressure into said inlet actuated by the movement of the automobile chassis upon a road, said means being designed to maintain a substantially constant lubricant pressure and feed without being substantially affected by oscillating movements of excessive violence over short periods of time, and said means including an inertia pump including a resiliently supported reciprocating weight, a connecting rod to operate the pump and dash pot means acting on the connecting rod, said pump and said dashpot being provided with pistons connected in series, the piston of said dashpot having a substantially greater area than the piston of said pump.

43. In a central lubricating installation for the central chassis bearings of an automobile chassis, said installation being of the type having a branched distributing piping system with a single inlet and a plurality of outlets to the bearings, and drip plugs in said outlets regulating the feed to said bearings; means for forcing lubricant under pressure into said inlet actuated by the movement of the automobile chassis upon a road, said means being designed to maintain a substantially constant lubricant pressure and feed without being substantially affected by oscillating movements of excessive violence over short periods of time, and said means including an inertia pumping mechanism comprising a reciprocating weight actuating means, two cylindrical members, pistons in both of said cylindrical members actuated upon operation of the device and in phase with each other, one of said pistons pumping liquid and the other piston damping movement of the device, the former piston being of substantially smaller diameter than the latter piston.

44. In a central lubricating installation for the central chassis bearings of an automobile chassis, said installation being of the type having a branched distributing piping system with a single inlet and a plurality of outlets to the bearings, and drip plugs in said outlets regulating the feed to said bearings; means for forcing lubricant under pressure into said inlet actuated by the movement of the automobile chassis upon a road, said means being designed to maintain a substantially constant lubricant pressure and feed without being substantially affected by oscillating movements of excessive violence over short periods of time, and said means including an inertia pumping arrangement comprising a reservoir casing, a pumping arrangement adjacent the bottom of said casing, an inertia motor adjacent the top of said casing and a piston cylinder arrangement associated with the motor for damping movement thereof, said pumping arrangement and said piston cylinder arrangement each being provided with reciprocating pistons and the area of the piston of said pumping arrangement being much smaller than the displacing area of the piston of said piston cylinder arrangement.

45. In a central lubricating installation for the central chassis bearings of an automobile chassis, said installation being of the type having a branched distributing piping system with a single inlet and a plurality of outlets to the bearings, and drip plugs in said outlets regulating the feed to said bearings; means for forcing lubricant under pressure into said inlet actuated by the movement of the automobile chassis upon a road, said means being designed to maintain a substantially constant lubricant pressure and feed without being substantially affected by oscillating movements of excessive violence over short periods of time, and said means including a lubricant supply and pressure installation comprising a reciprocating weight actuating means, a reservoir casing, a pumping arrangement adjacent the bottom of the casing and actuating connections adjacent the top of the casing, said pump arrangement being provided with two reciprocating pumping elements, one of which ejects lubricant under pressure into the system and the other of which works idly to damp the movement thereof, said reciprocating pumping elements being each provided with a piston and said piston being connected in series and moving upwardly and downwardly simultaneously in phase with each other and in phase with the weight actuating means.

46. In a central lubricating installation for the central chassis bearings of an automobile chassis, said installation being of the type having a branched distributing piping system with a single inlet and a plurality of outlets to the bearings, and drip plugs in said outlets regulating the feed to said bearings; means for forcing lubricant under pressure into said inlet actuated by the movement of the automobile chassis upon a road, said means being designed to maintain a substantially constant lubricant pressure and feed without being substantially affected by oscillating movements of excessive violence over short periods of time, and said means including a lubricant supply and pressure installation comprising a reciprocating weight actuating means, a reservoir casing, a pumping arrangement adjacent the bottom of the casing and actuating connections adjacent to the top of the casing, said pump arrangement being provided with two reciprocating pumping elements, one of which ejects lubricant under pressure into the system and the other of which works idly to damp the movement thereof, said reciprocating pumping elements consisting of pistons, with the area of the damping piston being substantially greater than the area of the ejecting piston.

47. A lubricant supply and pressure installation for a central lubricating installation comprising a reservoir casing, a pump construction positioned adjacent the bottom of said casing, an inertia motor positioned adjacent the top of said casing and an actuating connection between said inertia motor and said pump construction, said inertia motor consisting in part of a round reciprocating weight, a resilient support for said weight and a resilient stop for said weight substantially therebelow, the bottom of said weight being provided with a conical depression, whereby it will extend downwardly farthermost at its periphery and the stop consisting of a resilient annulus centrally supported, said disk and said weight being conformed so that the stopping contact therebetween will be confined to the outer periphery of the disk and to the outside periphery of the bottom face of the weight.

48. A reservoir, pump and motor unit for centralized liquid distributing systems including a reservoir tank, a pump positioned adjacent the bottom thereof consisting in part of a pump cylinder and a pump piston inserted therein, a reciprocating inertia weight mounted above the top of the tank and a connection extending from said weight to said piston through the top of the tank, said weight, said connection and said piston reciprocating upwardly and downwardly together in phase with each other, said connection consisting of a rod and a reservoir tank being provided with a sleeve member fixed in the top thereof receiving said rod, said weight being resiliently supported by a coil spring reacting on the top of said reservoir, and being provided with a guiding bearing outside of said sleeve.

49. A reservoir, motor and pump unit including a reservoir shell, a pump arranged adjacent the bottom of the shell, a hollow bearing post fixed to and rising from the top of the shell, a cylinder extending from the pump approximately to the top of the shell and into which oil from the reservoir is adapted to flow, means to filter such oil before it reaches the cylinder, a cap closing the top of the cylinder, means screwed on to the lower end of the bearing post to retain the cap in position, an inertia weight sliding member on the post, a spring supporting the inertia weight in floating position, a strap carried by the inertia weight and straddling the post, a connecting rod for actuating the pump, rigidly fixed to the strap end, and extending through the post, said connecting rod serving as the plunger of the pump and being springy, thin, metal stock to accommodate for misalignment of the motor and pump.

JOSEPH BIJUR.